United States Patent [19]

Busbridge et al.

[11] Patent Number: 4,827,252

[45] Date of Patent: May 2, 1989

[54] DISPLAY METHODS AND APPARATUS

[75] Inventors: Michael L. Busbridge; David J. Puleston, Both of Kent, England

[73] Assignee: Gec-Marconi Limited, England

[21] Appl. No.: 86,860

[22] Filed: Aug. 19, 1987

[30] Foreign Application Priority Data

Aug. 22, 1986 [GB] United Kingdom ............... 8620433

[51] Int. Cl.$^4$ ................................................ G09G 1/00
[52] U.S. Cl. ..................... 340/729; 340/734; 434/43; 364/522
[58] Field of Search ............. 340/727, 729, 734, 747, 340/798, 750, 971, 979, 995; 364/521, 522, 424; 434/43, 44

[56] References Cited

U.S. PATENT DOCUMENTS

| | | | |
|---|---|---|---|
| 2,967,263 | 1/1961 | Steinhauser | 434/43 |
| 3,010,222 | 11/1961 | Carel | 434/44 |
| 3,639,034 | 2/1972 | La Russa | 434/43 |
| 3,911,597 | 10/1975 | Millard et al. | 434/43 |
| 4,682,160 | 7/1987 | Beckwith et al. | 340/747 |

Primary Examiner—John W. Caldwell, Sr.
Assistant Examiner—Jeffery A. Brier
Attorney, Agent, or Firm—Kirschstein, Kirschstein, Ottinger & Israel

[57] ABSTRACT

A method and apparatus for using stored data to produce a representation of a surface from the perspective of a platform moving across the surface (e.g. of ground terrain from an aircraft overflying the terrain) wherein the representation comprises a perspective view of an array of elements modelling the surface and the orientation of the array with respect to the surface changes with the direction of movement of the platform across the surface so as to keep the array aligned with the direction of platform movement and so avoid confusing changes in the display with changes in platform movement direction.

12 Claims, 2 Drawing Sheets

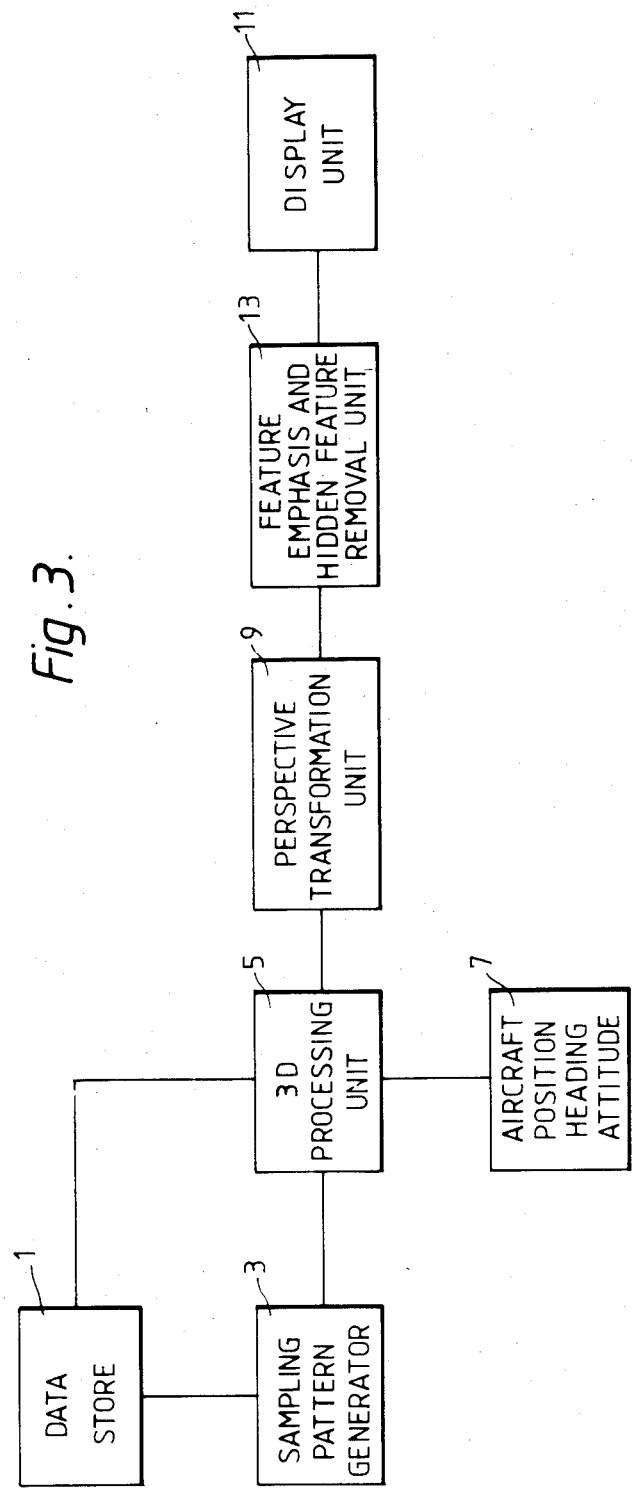

DISPLAY METHODS AND APPARATUS

BACKGROUND OF THE INVENTION

1. Field of the Invention

This invention relates to display methods and apparatus.

More particularly the invention relates to such methods and apparatus for using data representing a three-dimensional surface to produce a two-dimensional display representing a perspective view of the surface.

In the present specification the term perspective view includes a quasi-perspective view, e.g. an isometric view.

One particular application of such methods and apparatus is in an aircraft for providing a pilot with a real time display of the ground terrain ahead of the aircraft e.g. to assist navigation in poor visibility. Another application is in aircraft flight simulators.

2. Description of Related Art

In known such methods and apparatus the display comprises a perspective view of an array of elements appearing to model the surface, the array appearing to be fixed with respect to the surface. Such a display is satisfactory in many environments, but when used in a high speed, high stress environment, such as a combat aircraft, can present a display which changes confusingly with observer motion.

SUMMARY OF THE INVENTION

It is an object of the present invention to provide a display of such a form as to overcome this difficulty.

According to a first aspect of the invention in a method of using data representing a three-dimensional surface to produce a two-dimensional display representing a perspective view of the surface from a platform moving across said surface, said display is in the form of a perspective view of an array of elements appearing to model the surface, and the orientation of the array is arranged to change with the direction of motion of the platform across said surface so that a predetermined axis of the array always lies along said direction of motion.

According to a second aspect of the invention an apparatus for using data representing a three-dimensional surface to produce a two-dimensional display representing a perspective view of the surface from a platform moving across said surface comprises: means for utilising said data to produce a said display in the form of a perspective view of an array of elements which appears to model said surface and whose orientation changes with the direction of motion of the platform across said surface so that a predetermined axis of the array always lies along said direction of motion.

BRIEF DESCRIPTION OF THE DRAWINGS

The invention will now be further explained and one method and apparatus in accordance with the invention described by way of example with reference to the accompanying drawings in which:

FIG. 3 is a block schematic diagram of an apparatus according to the invention.

DETAILED DESCRIPTION OF THE PREFERRED EMBODIMENTS

Figure 1:
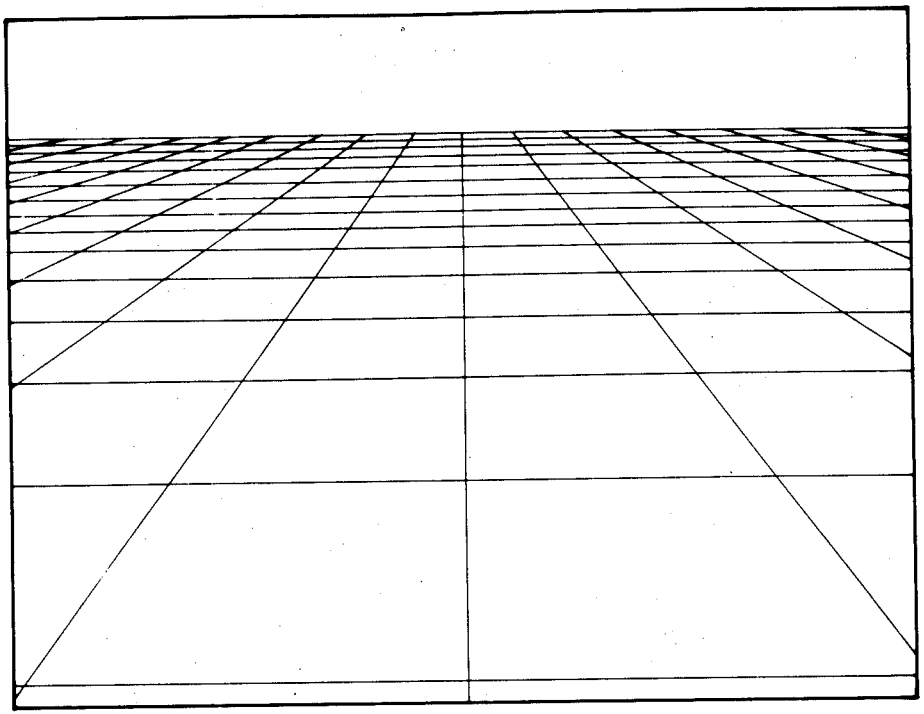
FIGS. 1 and 2 illustrate displays obtained by methods and apparatus of the kind to which the present invention relates.
Figure 2:
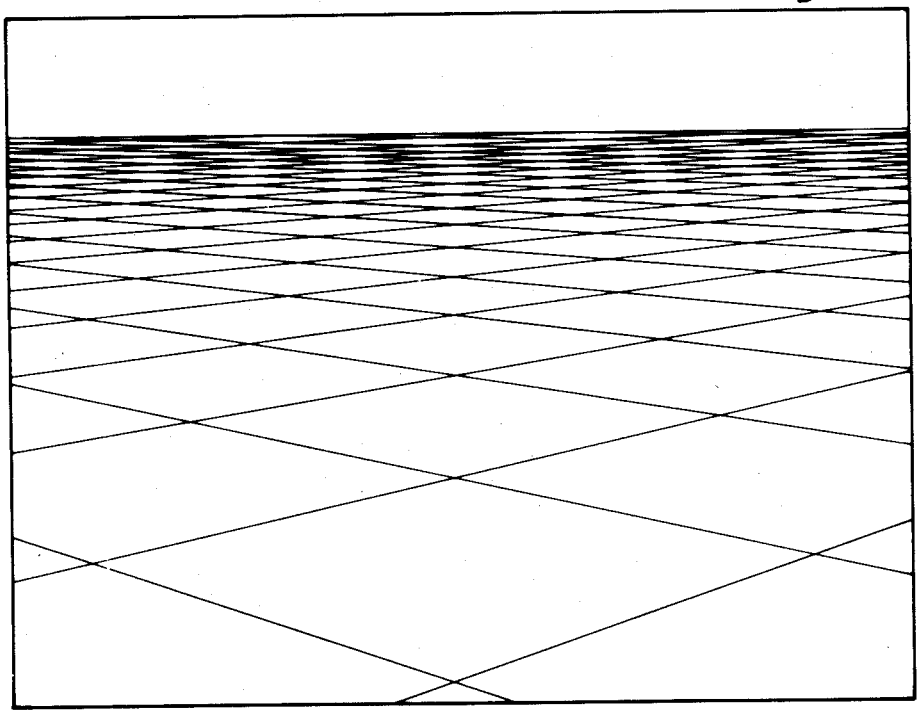

FIGS. 1 and 2 show two two-dimensional displays each representing a perspective view of the terrain ahead of a moving platform, e.g. an aircraft, wherein the display comprises a perspective view of a rectangular grid of lines which appears to model the terrain and is fixed with respect thereto. The terrain depicted in FIGS. 1 and 2 is featureless, i.e. flat, for the sake of simplicity.

Such a display suffers from two disadvantages.

Firstly, as the direction of motion of the aircraft changes, the pattern of lines will twist and distort. Thus the observer sees a pattern of rectangles when moving along the direction of one or other of the two sets of parallel lines, as illustrated in FIG. 1, but sees a diamond pattern when moving in a direction at an angle to each of the two sets of parallel lines, as illustrated in FIG. 2.

Secondly, when moving in a direction at an angle to each of the two sets of parallel lines, as shown in FIG. 2, the display appears to contain sideways components of motion in that each set of parallel lines appears to move in a direction perpendicular to the lines of that set.

In accordance with the present invention the orientation of the grid of lines is arranged to change with the direction of motion so that, whatever the direction of motion, one of the sets of parallel lines is aligned with the direction of motion and the form of the display is always as shown in FIG. 1.

It will be understood that this necessarily requires the grid of lines to be no longer fixed with respect to the terrain. Hence in a display in accordance with the invention features in the terrain will appear to move with respect to the grid at least with change in direction of motion.

In implementation of a display in accordance with the invention it is often easier to arrange for the grid to appear to move across the terrain with movement of the observer across the terrain so that in the display the grid appears entirely stationary at all times, and features in the terrain appear to move with respect to the grid not only with changes in direction, but also with motion across the terrain. However, to preserve the illusion of movement, it is preferable to arrange for the grid to appear fixed with respect to the terrain with movement of the observer across the terrain, i.e. so that the horizontal lines of the display appear to move towards the bottom of the display with forward movement of the observer. It will be understood that features in the terrain will then appear to move with respect to the grid only for changes in direction of motion.

One apparatus in accordance with the invention will now be described with reference to FIG. 3.

The apparatus includes a digital data store 1 in which is stored a representation of the earth's surface in the locality in which the aircraft is to fly. The representation is typically in the form of an array of values, each of which values represents the vertical height above a base plane of a respective point on the earth's surface, each point being vertically above a respective intersection point of a regular nominally rectangular grid of lines in the base plane, the lines having a fixed orientation to the earth's surface e.g. north-south or east-west.

The data stored in the store 1 thus comprises data of the kind contained in Digital Land Mass Survey - Digital Terrain Elevation Data (DLMS DTED) data bases such as are available from the Defense Mapping Agency in the United States of American and the Mapping and Charting Establishment RE, Feltham in the United Kingdom.

The apparatus further includes a sampling pattern generator 3 which causes data to be passed from the store 1 to a 3D processing unit 5. The unit 5 operates under control of the generator 3 in conjunction with signals received from a unit 7 representing the aircraft's position, heading and attitude to produce at its output signals relating to the ground terrain ahead of the aircraft in its direction of flight correctly adjusted for pitch and roll. The output of the unit 5 comprises x, y and z signals in respect of each intersection point in a rectangular grid of lines modelling the ground terrain ahead of the aircraft and having an orientation with respect to the terrain which changes with the direction of aircraft motion, i.e. aircraft heading, so that its two sets of parallel lines are always respectively parallel and perpendicular to the direction of aircraft motion. The x and y signals indicate the coordinates of the projection of an intersection point on a base plane and the z signal indicates the height of the point above the base plane.

To preserve an illusion of forward motion on the display the lines of the grid are preferably arranged to remain fixed with respect to the terrain with forward movement of the aircraft, but may alternatively move across the terrain with such forward motion.

The output of the processing unit 5 is passed to a perspective transformation unit 9 which uses a transformation algorithm to convert the three-dimensional coordinate input signals x, y, z to two-dimensional coordinate signals, x', y' which indicate the position of each point represented in the output of the unit 5 in a two-dimensional display representing a perspective view from the position of the aircraft of the surface which the points represent.

The output of the transformation unit 9 is passed to a display unit 11, typically a raster scanning cathode ray tube display unit, via a feature emphasis and hidden feature removal unit 13.

The unit 13 suppresses all the x', y' signals relating to those points which lie in parts of the ground terrain ahead of the aircraft which will be hidden in the two-dimensional perspective view by virtue of the non-transparency of the surface.

The unit 13 further generates signals defining lines extending along the edges of upstanding features of the perspective view which conceal more distance portions of the perspective view i.e. so-called ridge lines.

The display unit 11 provides a display comprising a grid of lines whose intersection points are determined by the x', y' signals at the output of the unit 13. The display thus comprises a view from the perspective of the aircraft of a rectangular grid of lines which models the ground terrain ahead of the aircraft, and whose two sets of parallel lines are respectively always parallel and perpendicular to the direction of aircraft motion. In addition, the display has lines extending along the ridge lines of the displayed perspective view.

It will be appreciated that if desired the unit 13 may be omitted.

Whilst in the method and apparatus described above by way of example the display comprises a perspective view of a rectangular grid of lines, in other methods and apparatus in accordance with the invention the display may be of a different form. Thus the display may for example comprise a perspective view of a rectangular array of discrete elements, e.g. dots, such a display format comprising the subject of UK patent application No. 8704807. Furthermore, the array need not necessarily be of rectangular form but may, for example, be of triangular form. However, in this case it will be possible only to avoid changes in shape of the elements of the array as displayed, and not sideways components of motion in the display.

We claim:

1. A method of using data representing a three-dimensional surface to produce a two-dimensional display representing a perspective view of the surface from, and in a predetermined direction relative to, a platform moving across said surface, comprising the steps of forming said display in the form of a perspective view of an array of elements configured as a rectangular grid of lines in a configuration having an axis and appearing to model the surface, and arranging the orientation of the array
with respect to the surface it models to change with a direction of motion of the platform across said surface so that said axis always lies along said direction of motion.

2. A method according to claim 1 comprising the steps of: deriving from said data first signals representing the positions in a three-dimensional coordinate system of each of a plurality of points in said array; transforming said first signals to second signals representing the positions of said points in said perspective view of said array; and utilizing said second signals to produce said display.

3. A method according to claim 1 wherein said axis is one of the two orthogonal main axes of the array.

4. A method according to claim 1 wherein said array appears to remain fixed with respect to said surface with movement of said platform across said surface.

5. A method according to claim 1 wherein said perspective view is a view ahead of said platform in said direction of motion of the platform.

6. A method according to claim 1 wherein said platform is an aircraft and said surface is the ground terrain in a locality in which the aircraft is flying.

7. An apparatus for using data representing a three-dimensional surface to produce a two-dimensional display representing a perspective view of the surface from, and in a predetermined direction relative to, a platform moving across said surface comprising: means for utilizing said data to produce a said display in the form of a perspective view of an array of elements configured as a rectangular grid of lines in a configuration having an axis and which appears to model said surface and whose orientation with respect to the surface it models changes with a direction of motion of the platform across said surface so that said axis alway lies along said direction of motion.

8. An apparatus according to claim 7 comprising: storage means for storing said data; means for utilizing said data to produce first signals representing the positions in a three-dimensional coordinate system of each of a plurality of points in said array; means utilizing said first signals to produce second signals representing the positions of said points in said perspective view of said array; and means utilizing said second signals to produce said display.

9. An apparatus according to claim 7 wherein said axis is one of the two orthogonal main axes of the array.

10. An apparatus according to claim 7 wherein said array appears to remain fixed with respect to said surface with motion of said platform across said surface.

11. An apparatus according to claim 7 wherein said perspective view is a view ahead of said platform in said direction of movement of the platform.

12. An apparatus according to claim 7 wherein said platform is an aircraft and said surface is the ground terrain in a locality in which the aircraft is flying.

* * * * *